(12) United States Patent
Feichtinger

(10) Patent No.: US 11,351,851 B2
(45) Date of Patent: Jun. 7, 2022

(54) FASTENING APPARATUS FOR FASTENING A HIGH-VOLTAGE STORAGE HOUSING TO A BODYSHELL COMPONENT OF A MOTOR VEHICLE, AND HIGH-VOLTAGE STORAGE HOUSING

(71) Applicant: Bayerische Motoren Werke Aktiengesellschaft, Munich (DE)

(72) Inventor: Jens Feichtinger, Holzkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/046,083

(22) PCT Filed: Apr. 8, 2019

(86) PCT No.: PCT/EP2019/058817
§ 371 (c)(1),
(2) Date: Oct. 8, 2020

(87) PCT Pub. No.: WO2019/201647
PCT Pub. Date: Oct. 24, 2019

(65) Prior Publication Data
US 2021/0031609 A1    Feb. 4, 2021

(30) Foreign Application Priority Data

Apr. 20, 2018   (DE) ..................... 10 2018 109 508.2

(51) Int. Cl.
*B60K 1/04*    (2019.01)

(52) U.S. Cl.
CPC ........ *B60K 1/04* (2013.01); *B60K 2001/0438* (2013.01)

(58) Field of Classification Search
CPC .. B60K 2001/0438; B60K 1/04; B62D 21/15; B62D 21/155
(Continued)

(56) References Cited

U.S. PATENT DOCUMENTS 4,863,214 A * 9/1989 Kranis, Jr. ............. B62D 21/09
280/797
6,102,605 A * 8/2000 Emmons .............. B62D 63/025
403/217

(Continued)

FOREIGN PATENT DOCUMENTS

DE    10 2011 116 630 A1    4/2013
DE    10 2012 102 938 A1    10/2013
(Continued)

OTHER PUBLICATIONS

International Search Report (PCT/ISA/210) issued in PCT Application No. PCT/EP2019/058817 dated Aug. 23, 2019 with English translation (four (4) pages).
(Continued)

*Primary Examiner* — Jeffrey J Restifo
(74) *Attorney, Agent, or Firm* — Crowell & Moring LLP

(57) ABSTRACT

A fastening apparatus for fastening a high-voltage storage housing to a bodyshell component of a motor vehicle, includes a plurality of fastening elements, which can be connected to the bodyshell component of a motor vehicle, and a base element integrally formed with the fastening elements, by which the fastening apparatus can be connected to the high voltage storage housing. The base element has a framework structure having a plurality of webs, by which the fastening elements are connected to one another.

13 Claims, 1 Drawing Sheet

(58) Field of Classification Search
USPC .......................................................... 180/68.5
See application file for complete search history.

(56) References Cited

U.S. PATENT DOCUMENTS

| | | | | |
|---|---|---|---|---|
| 6,296,300 | B1* | 10/2001 | Sato ..................... | B62D 21/152 |
| | | | | 296/187.08 |
| 6,357,822 | B1* | 3/2002 | Panoz ................. | B62D 21/157 |
| | | | | 296/187.12 |
| 7,044,492 | B1* | 5/2006 | Andersson ............ | B62D 53/08 |
| | | | | 280/433 |
| 8,833,839 | B2* | 9/2014 | Young ................. | B62D 21/157 |
| | | | | 296/187.12 |
| 8,894,128 | B2* | 11/2014 | Barral ................. | B62D 29/005 |
| | | | | 296/146.6 |
| 9,281,505 | B2* | 3/2016 | Hihara ................ | H01M 8/1072 |
| 9,493,190 | B1* | 11/2016 | Alwan ................. | B62D 21/157 |
| 9,505,442 | B2* | 11/2016 | Wu .......................... | B60K 1/04 |
| 9,545,952 | B2* | 1/2017 | Sakaguchi ........... | B62D 21/157 |
| 9,567,013 | B2* | 2/2017 | Ehrlich .................. | B60R 13/08 |
| 9,623,742 | B2* | 4/2017 | Ikeda ...................... | B60L 50/71 |
| 9,796,424 | B2* | 10/2017 | Sakaguchi ............ | B62D 21/03 |
| 9,809,100 | B2* | 11/2017 | Kamimura ........... | B62D 21/157 |
| 9,809,101 | B2* | 11/2017 | Ikeda ................. | B62D 25/2036 |
| 10,494,030 | B1* | 12/2019 | Paramasivam ........ | B62D 25/20 |
| 10,589,614 | B2* | 3/2020 | Ovgard .................. | B60L 50/64 |
| 10,720,620 | B1* | 7/2020 | Grace ................... | H01M 50/20 |
| 10,766,540 | B2* | 9/2020 | Sono .................... | B62D 21/157 |
| 10,843,545 | B2* | 11/2020 | Grace ...................... | B60K 1/04 |
| 10,967,910 | B2* | 4/2021 | Kim ..................... | B62D 21/152 |
| 11,040,608 | B2* | 6/2021 | Lange ..................... | B60K 1/04 |
| 11,088,416 | B2* | 8/2021 | Popovski ................ | B60K 1/04 |
| 2013/0192914 | A1* | 8/2013 | Nakamori ............. | H01M 50/20 |
| | | | | 180/68.5 |
| 2013/0266835 | A1* | 10/2013 | Bender ................. | H01M 50/20 |
| | | | | 429/100 |
| 2014/0147717 | A1* | 5/2014 | Sundararajan ......... | B62D 21/06 |
| | | | | 429/99 |
| 2016/0114667 | A1* | 4/2016 | Ikeda ..................... | B60L 50/71 |
| | | | | 180/68.5 |
| 2021/0031609 | A1* | 2/2021 | Feichtinger .............. | B60K 1/04 |
| 2021/0179176 | A1* | 6/2021 | Kim ....................... | B62D 21/08 |

FOREIGN PATENT DOCUMENTS

| | | |
|---|---|---|
| DE | 10 2013 223 636 A1 | 5/2014 |
| DE | 10 2015 224 777 A1 | 6/2017 |
| WO | WO 2014/140412 A1 | 9/2014 |

OTHER PUBLICATIONS

German-language Written Opinion (PCT/ISA/237) issued in PCT Application No. PCT/EP2019/058817 dated Aug. 23, 2019 (five (5) pages).

German-language Search Report issued in German Application No. 10 2018 109 508.2 dated Feb. 5, 2019 with partial English translation (13 pages).

* cited by examiner

FASTENING APPARATUS FOR FASTENING A HIGH-VOLTAGE STORAGE HOUSING TO A BODYSHELL COMPONENT OF A MOTOR VEHICLE, AND HIGH-VOLTAGE STORAGE HOUSING

BACKGROUND AND SUMMARY OF THE INVENTION

The invention relates to a fastening apparatus for fastening a high-voltage storage housing to a bodyshell part of a motor vehicle, and to a high-voltage storage housing having a fastening apparatus.

DE 10 2011 116 630 A1 discloses a high-voltage store having a housing for accommodating energy storage cells. On both sides of the housing, there is in each case one holding apparatus for fastening the high-voltage store to a vehicle body. The holding apparatus comprises a screw connection via which the holding apparatus can be connected to a vehicle longitudinal member.

It is an object of the present invention to provide a fastening apparatus for fastening a high-voltage storage housing to a bodyshell part of a motor vehicle, and a high-voltage storage housing having a fastening apparatus, which are of particularly lightweight design.

This object is achieved according to the invention by a fastening apparatus for fastening a high-voltage storage housing to a bodyshell part of a motor vehicle having the features of the independent claim and by a high-voltage storage housing having such a fastening apparatus. The dependent patent claims and the description relate to advantageous embodiments of the invention.

A first aspect of the invention relates to a fastening apparatus for fastening a high-voltage storage housing to a bodyshell part of a motor vehicle. The fastening apparatus comprises a plurality of fastening elements which are able to be connected to the bodyshell part of the motor vehicle. Furthermore, the fastening apparatus comprises a base element which is formed in one piece with the fastening elements and via which the fastening apparatus is able to be connected to the high-voltage storage housing. The fastening apparatus may, for example, be able to be connected to the bodyshell part of the motor vehicle by means of at least one screw connection. The fastening elements, via which the fastening apparatus is able to be connected to the bodyshell part, are positioned relative to one another via the base element, wherein the fastening elements and the base element are formed in one piece and the fastening apparatus is thus formed as one part. The fastening apparatus is for example connected to the high-voltage storage housing via a materially bonded connection and/or via a force-fitting connection and/or via a form-fitting connection. In particular, the fastening apparatus is screwed and/or welded to the high-voltage storage housing.

In order to make possible a particularly lightweight and thus low-weight design of the fastening apparatus, it is provided according to the invention that the base element comprises a framework structure having a plurality of webs via which the fastening elements are connected to one another. In other words, the fastening elements are positioned relative to one another by means of the webs and, furthermore, are connected to one another via the webs. The webs are arranged spaced apart from one another at least regionally, with the result that at least one material-free free space is bordered by means of the webs. In other words, the base element is designed in the form of a bar arrangement composed of webs which are subjected to tensile or compressive loading and whose ends are connected to one another via nodes. The framework structure makes it possible for the base element to be of particularly stable, and at the same time particularly lightweight, design. Thus, via the webs, which provide the framework structure, the fastening elements are advantageously able to be positioned relative to one another in a particularly stable manner.

In this context, it has proven to be advantageous if the fastening apparatus is a cast part or a forged part. This means that the fastening apparatus and thus the fastening elements and the base element formed in one piece with the fastening elements have been manufactured in a casting process or in a forging process. For a forged design of the fastening apparatus, a failure behavior and/or a deformation of the fastening apparatus can be set in a targeted manner. Furthermore, the fastening apparatus, as a cast part or as a forged part, is able to be produced particularly quickly in comparison with a welded design.

In a further configuration of the invention, it has proven to be advantageous if at least one of the fastening elements is arranged at a crossing point of at least two webs. The at least one fastening element is thus connected to at least two webs which are oriented at an angle to one another. This makes possible a particularly stable design of the fastening apparatus. In this case, at least one of the webs is arranged at one end on a first fastening element and at the other end on a second fastening element, so as to connect the one fastening element to the other fastening element. This allows the fastening elements to be arranged for example at nodes of the framework structure, whereby the fastening apparatus can be designed to be particularly stable.

In a further advantageous configuration of the invention, it is provided that fastening elements have bores via which the fastening apparatus is able to be brought into engagement with the bodyshell part. For example, the bores have respective threads via which the fastening elements can be connected to the bodyshell part of the motor vehicle by means of screw connections. The bores are different from the material-free free surfaces of the framework structure that are bordered by the webs. For example, the bores run perpendicularly to a planar framework structure defined by the webs. Consequently, the fastening apparatus can be connected to the bodyshell part of the motor vehicle via a force direction running perpendicularly to the plane of the framework structure. The bores make possible particular simple fastening of the fastening apparatus to the bodyshell part of the motor vehicle.

In a further configuration of the invention, it has proven to be advantageous if at least two webs are connected to one another via a surface element which is bordered by the webs and which has at least one bore. In other words, at least two webs are connected to one another via the planar surface element, wherein a plane of the surface element extends parallel to the planar framework structure. The at least one bore of the surface element makes possible a further fastening of the fastening apparatus, via the surface element, to the bodyshell part of the motor vehicle. Furthermore, the surface element can lead to particularly high stability of the fastening apparatus.

In a further advantageous configuration of the invention, it is provided that the fastening elements are each connected to at least three webs which are arranged in a plane at an angle to one another. This makes it possible to at least substantially prevent torsion of the respective fastening element, attached via the three webs, relative to the webs or relative to the base element and thus to achieve a particularly stable design of the fastening apparatus.

In a further configuration of the invention, it has proven to be advantageous if the fastening elements project beyond the webs at at least one support side of the fastening apparatus, wherein the support side is configured to be placed onto the bodyshell part at a support surface of the bodyshell part for the purpose of connecting the fastening apparatus. This means that the fastening elements project beyond the webs perpendicularly to the plane, defined by the webs, of the framework structure. Thus, if the fastening apparatus is arranged onto the support surface of the bodyshell part, which support surface is arranged at least substantially parallel to the plane of the framework structure of the webs, then at least one of the fastening elements bears on the support surface of the bodyshell part, wherein the webs are spaced apart from the support surface of the bodyshell part. This ensures that the fastening elements, via which the fastening apparatus is to be connected to the bodyshell part, are not impeded by the webs while said fastening elements are bearing as areally as possible on the support surface of the bodyshell part. Consequently, when the fastening apparatus is connected to the bodyshell part, the fastening elements are to bear against the bodyshell part, wherein the webs are spaced apart from the bodyshell part and position the fastening elements relative to one another. Consequently, the fastening elements have a height which runs perpendicularly to the plane formed by the framework structure, which is greater than a height of the webs oriented in this manner. In particular, the fastening elements project beyond the webs perpendicularly to the plane formed by the framework structure both upwardly and downwardly. Thus, in particular, at both openings of the respective continuous bores of the fastening elements, it is possible for the respective fastening element to be particularly advantageously placed on the support surface of the bodyshell part upwardly and downwardly. In this way, a particularly stable connection of the fastening apparatus to the bodyshell part of the motor vehicle is able to be established.

In an alternative configuration of the invention, it has proven to be advantageous if the fastening apparatus has a bearing side on which the base element bears areally against the bodyshell part when the fastening apparatus is fastened via the fastening elements to the bodyshell part. This means that the base element is in areal contact with the bodyshell part, with the fastening apparatus being fastened via the fastening elements to the bodyshell part. In this arrangement, the webs of the framework structure extend in a plane which is parallel to a surface of the bodyshell part that bears against the bearing side. The areal bearing of the fastening apparatus at least substantially over the entire bearing side thereof makes possible particularly secure fastening of the high-voltage storage housing to the bodyshell part of the motor vehicle.

In this context, it has proven to be particularly advantageous if all the webs of the framework structure bear against the bodyshell part when the fastening apparatus is fastened via the fastening elements to the bodyshell part. This means that, when the fastening apparatus bears via the base element on the bodyshell part, each of the webs of the framework structure is in direct contact with the bodyshell part. In particular, the webs at the fastening apparatus, which is fastened to the bodyshell part, are, along their direction of longitudinal extent, arranged parallel to a surface of the bodyshell part that is in contact with the fastening apparatus. It is thus possible with a particularly lightweight design of the fastening apparatus for particularly extensive areal contact between the fastening apparatus and the bodyshell part to be established, for the purpose of ensuring secure fastening of the high-voltage storage housing to the bodyshell part.

In a further configuration of the invention, it has proven to be advantageous if the fastening elements are integrated into the framework structure of the base element. This means that at least one of the fastening elements is surrounded over the full circumference by the framework structure of the base element. Further fastening elements may be arranged at an edge of the framework structure. The at least one fastening element surrounded over the full circumference by the framework structure of the base element is connected to webs of the framework structure so as to be held in the plane of the webs of the framework structure. In the plane of the webs of the framework structure, webs of the framework structure are situated on all sides of the at least one fastening element surrounded over the full circumference by the framework structure of the base element, with the result that the fastening element, within the plane of the webs of the framework structure, is surrounded by the webs on each side. The base element is able to be fastened particularly securely to the bodyshell part via the fastening elements integrated into the framework structure.

A second aspect of the invention relates to a high-voltage storage housing having a fastening apparatus as has already been described in connection with the fastening apparatus according to the invention. This means that the one-piece fastening apparatus, which is designed for example as a cast part or forged part, is arranged on the high-voltage storage housing. Here, the fastening apparatus may be welded and/or adhesively bonded and/or screwed to the high-voltage storage housing.

Advantages and advantageous refinements of the fastening apparatus according to the invention are to be considered as being advantages and advantageous refinements of the high-voltage storage housing according to the invention and vice versa. For this reason, the advantages and advantageous refinements of the high-voltage storage housing according to the invention are not described again here.

In an advantageous refinement of the high-voltage storage housing, it is provided that the fastening apparatus is arranged on an end-side side wall of the high-voltage storage housing. The side wall of the high-voltage storage housing is a narrow side of the high-voltage storage housing. The end-side side wall is an end side of the high-voltage storage housing. Thus, when the high-voltage storage housing is installed into the motor vehicle, the high-voltage storage housing is connected via the end-side side wall to the bodyshell part of the motor vehicle by means of the fastening apparatus. The high-voltage storage housing can thereby be fastened to the bodyshell part of the motor vehicle in a particularly space-saving manner. In particular, the fastening apparatus is in this way able to be designed in a particularly space-saving manner.

It has proven to be particularly advantageous if the fastening apparatus is arranged on an end-side side wall of the high-voltage storage housing, which end-side side wall is at the front along a vehicle longitudinal direction in an installation position of the high-voltage storage housing in the motor vehicle, and projects perpendicularly from the front end-side side wall. In other words, the fastening apparatus projects perpendicularly forward beyond a surface of the front end-side side wall, also referred to as front end side, of the high-voltage storage housing. In this way, the high-voltage storage housing can be fastened to a front transverse member of the motor vehicle as the bodyshell part. This makes possible particularly stable fastening of the high-voltage storage housing to the bodyshell part of the motor vehicle.

Further features of the invention will emerge from the claims, from the figures and from the description of the figures. The features and feature combinations mentioned above in the description and the features and feature combinations mentioned below in the description of the figures and/or shown in the figures alone are able to be used not only in the respectively specified combination but also in other combinations or individually.

The invention will now be discussed in more detail on the basis of a preferred exemplary embodiment and with reference to the drawings.

DETAILED DESCRIPTION OF THE DRAWINGS

Figure 1:
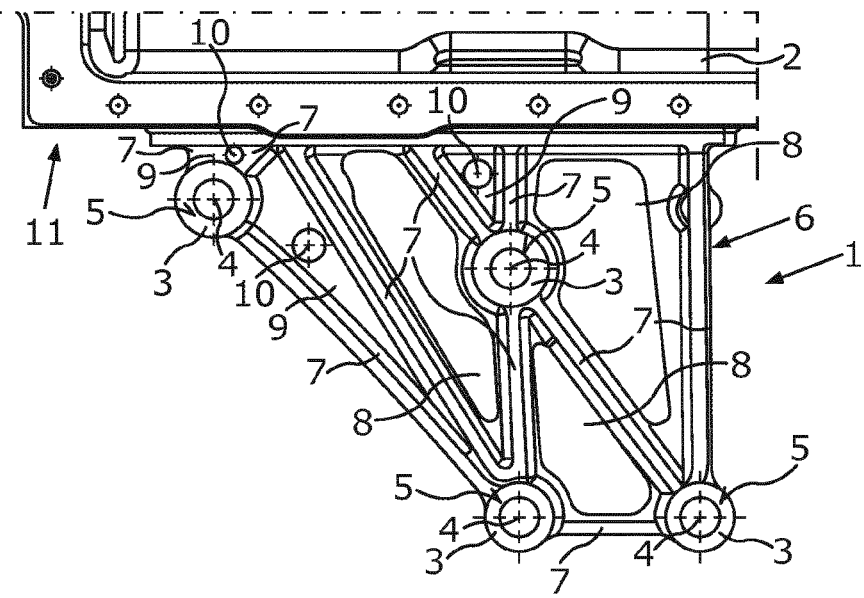
FIG. 1 is a schematic plan view of a fastening apparatus for fastening a high-voltage storage housing to a bodyshell part of a motor vehicle, which has a plurality of fastening elements which are connected to one another via respective webs which form a framework structure.

FIG. 1 illustrates a schematic plan view of a fastening apparatus 1. By means of the fastening apparatus 1, a high-voltage storage housing 2 is able to be fastened to a bodyshell part of a motor vehicle. The high-voltage storage housing 2 can provide an accommodating space for a high-voltage storage device, wherein the motor vehicle is able to be driven by means of electrical energy from the high-voltage storage device.

In the present case, the one-piece fastening apparatus 1 is designed as a forged part.

Figure 2:
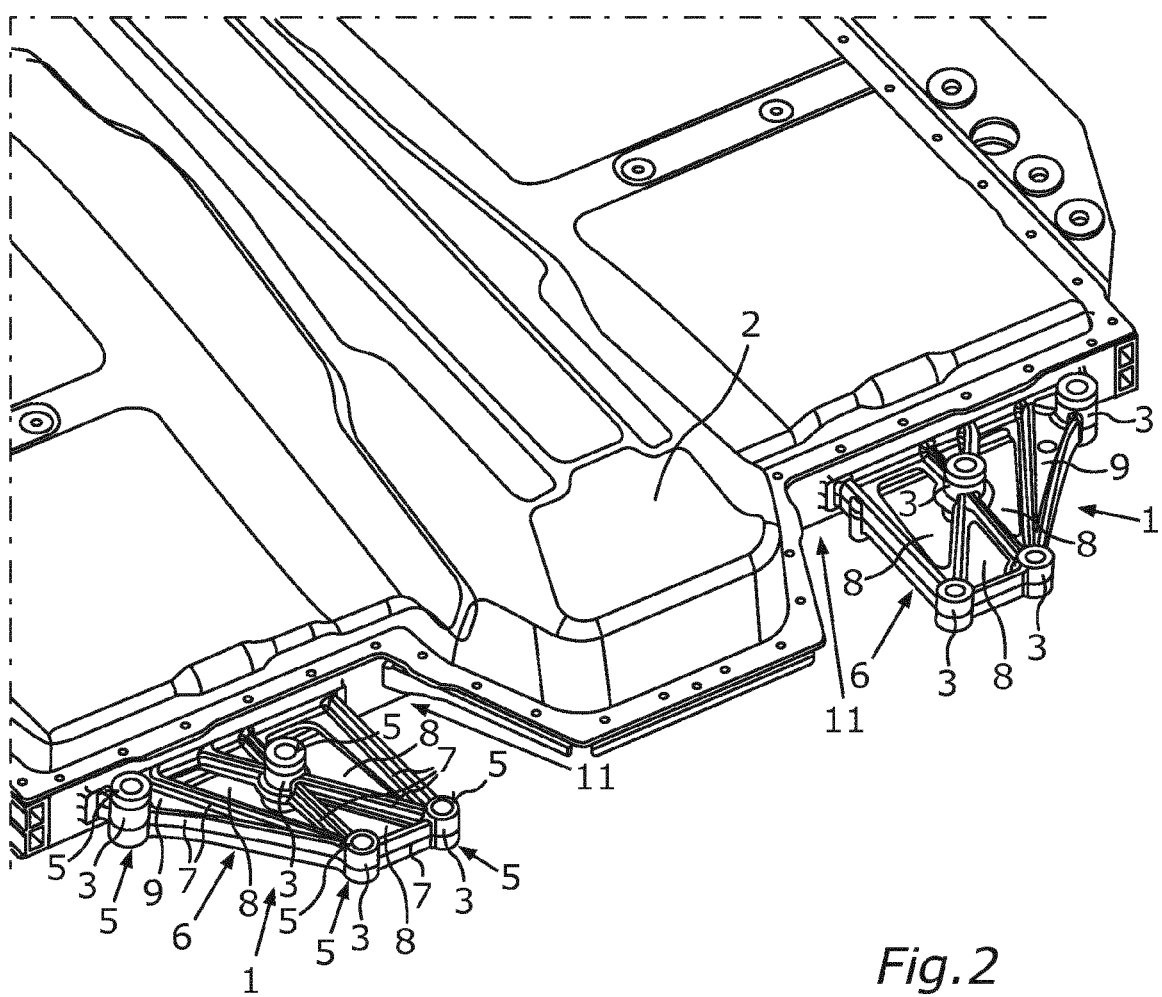
FIG. 2 is a schematic perspective view of the high-voltage storage housing with the fastening apparatus as per FIG. 1, wherein the webs form a two-dimensional framework structure.

The high-voltage storage housing 2 is illustrated in a schematic perspective view in FIG. 2, wherein, in the present case, the high-voltage storage housing 2 comprises at least two fastening apparatuses 1, by means of which the high-voltage storage housing 2 is able to be fastened to the bodyshell part of the motor vehicle. A plurality of battery cells and electronics and/or a cooling device for cooling the battery cells are able to be accommodated in the high-voltage storage housing 2, for the purpose of providing, by means of the battery cells, electrical energy for driving the motor vehicle. The bodyshell part of the motor vehicle may in particular be a vehicle longitudinal member or a vehicle transverse member.

For connecting the fastening apparatus 1 to the bodyshell part, the fastening apparatus 1 has a plurality of fastening elements 3, four fastening elements 3 in the present case, via which the fastening apparatus 1 is able to be connected to the bodyshell part. In the present case, the fastening elements 3 each have a continuous bore 4 via which the fastening elements 3 are able to be connected in a force-fitting manner to the bodyshell part. The fastening elements 3 are positioned in a plane relative to one another. For connecting the fastening elements 3 to the bodyshell part, the fastening elements 3 may be placed onto a support surface of the bodyshell part, in order to be connected to the bodyshell part via the bores 4. For this purpose, the fastening elements 3 may each have at least one support side 5, two mutually opposite support sides 5 in the present case, wherein the support sides 5 are each configured to be placed onto the bodyshell part for the purpose of connecting the fastening apparatus 1 to the bodyshell part.

In addition to the fastening elements 3, the fastening apparatus 1 comprises a base element 6 which is formed in one piece with the fastening elements 3 and via which the fastening apparatus 1 is able to be connected to the high-voltage storage housing 2. For a particularly stable and at the same time particularly lightweight design of the fastening apparatus 1, the base element 6 comprises a framework structure having a plurality of webs 7 via which the fastening elements 3 are connected to one another. Here, the fastening elements 3 are in the present case arranged at respective crossing points of the framework structure or of the webs 7. Thus, in the present case, the fastening elements 3 are each connected to at least three webs 7 which are arranged in the plane at an angle to one another.

The fastening apparatus 1 has a bearing side via which the fastening apparatus 1, in its state fastened to the bodyshell component, bears areally against the bodyshell part. The bearing side may be provided by the base element 6 and/or the fastening elements 3. For a particularly positionally secure placement and orientation of the fastening apparatus 1 relative to the bodyshell part, it may be provided that the base element 6 bears with its framework structure areally against the bodyshell part. It may be provided in particular that each web 7 of the base element 6 is connected to the bodyshell part when the fastening apparatus 1 is fastened to the bodyshell part.

Particularly secure fastening of the base element 6 to the bodyshell part is made possible if at least one of the fastening elements 3 is fully integrated into the framework structure. In this way, the framework structure of the base element 6 can be connected securely and firmly to the bodyshell part. In particular, the fastening elements 3 in their entirety are arranged on the base element 6 so as to be distributed over the framework structure. In this case, the fastening elements 3 may be arranged so as to be uniformly distributed over the base element 6. A fastening direction in which the fastening elements 3 are able to be connected in a force-fitting manner to the bodyshell part runs perpendicularly to the plane in which all the webs 7 of the planar framework structure lie.

In the present case, the webs 7 form a two-dimensional, planar framework structure. Alternatively, the webs 7 may form a three-dimensional framework structure. The framework structure is to be understood as being a bar arrangement, wherein, in the plane, multiple webs 7 border in combination at least one material-free space or one material-free surface 8 of the plane. Additionally, there may be arranged between at least two webs 7 a surface element 9 which is arranged in the plane and via which the respective webs 7 are connected to one another. In the present case, the framework structure encloses three material-free surfaces 8 in the plane. Furthermore, the fastening apparatus 1 has three surface elements 9, via which in each case three webs 7 are connected to one another. In the present case, each of the surface elements 9 has a bore 10 which in each case makes it possible for the fastening apparatus 1 to be connected to at least one further element.

As can be seen in FIG. 2, the fastening elements 3 project above the webs 7, and thus above the base element 6, along a direction of longitudinal extent of the bores 4 of the fastening elements 3. In this way, it can be ensured that, when the fastening apparatus 1 is placed on the bodyshell part with the support sides 5 of the fastening elements 3 arranged so as to face the bodyshell part, the support sides 5 of the fastening elements 3 can bear areally on the support surface of the bodyshell part. In the present case, the direction of longitudinal extent of the bores 4 runs perpendicularly to the plane of the planar framework structure.

As can be seen particularly clearly from FIG. 2, the fastening apparatus 1 is fastened to a front side wall 11, in particular an end side, of the high-voltage storage housing 2. The fastening apparatus 1 projects perpendicularly forward from the front side wall 11 of the high-voltage storage housing 2, with the result that the webs 7 of the planar framework structure are arranged in a plane which is perpendicular to the side wall 11. The high-voltage storage housing 2 is thereby able to be fastened to the bodyshell part of the motor vehicle via the front side wall 11, which allows a particularly space-saving attachment of the high-voltage storage housing 2 to a bodyshell of the motor vehicle to be realized. In the present case, on the end-side side wall 11 of the high-voltage storage housing 2, there are arranged two fastening apparatuses 1, which, in each case individually and in combination, extend merely over a sub-portion of the end-side side wall 11. In particular, the fastening apparatuses 1 each extend over less than a third, in particular over less than a quarter, of a side length of the side wall 11 of the high-voltage storage housing 2.

The fastening apparatus 1 is based on the realization that high-voltage storage housings are often designed as welded constructions which consist of connected profiles and mold parts. Here, attachments of the high-voltage storage housings 2 to a vehicle structure, in particular the bodyshell part, are also normally realized as a welded construction. High demands with regard to crash behavior and load transmission are placed here on the attachment of the high-voltage storage housing 2 to the vehicle structure. Welded attachments are very often complex subassemblies and have numerous weld points. In the case of welded attachments, it is often difficult to cope in a limited structural space in an underfloor of the motor vehicle and to connect the high-voltage storage housing 2 by means of the attachment at a multiplicity of interfaces of the vehicle structure.

In the present case, the high-voltage storage housing 2 is fastened to the vehicle structure, in particular the bodyshell part of the motor vehicle, by means of the forged or alternatively cast fastening apparatus 1 instead of by means of a welded attachment. The advantage in this case is a freely configurable geometry of the fastening apparatus 1 if this has been designed as a forged component or as a cast component. In this way, force flows in the fastening apparatus 1 can be optimally set, and a connection between the fastening apparatus 1 and the high-voltage storage housing 2 is able to be provided particularly easily by simple welded connections and suitable welding processes. With a design of the fastening apparatus 1 as a forged component, a failure behavior and a deformation of the fastening apparatus 1 can be set in a targeted manner. Furthermore, the fastening apparatus 1 can be produced particularly quickly if the fastening apparatus 1 is formed in one piece and does not need to be welded together from individual parts. In a configuration of the forged component, in addition to a vehicle attachment, further interfaces, such as the bores 10 of the respective surface element 9, can be integrated, for the purpose of connecting the fastening apparatus 1 to at least one further element.

LIST OF REFERENCE SIGNS

1 Fastening apparatus
2 High-voltage storage housing
3 Fastening element
4 Bore
5 Support side
6 Base element
7 Web
8 Material-free space or surface
9 Surface element
10 Bore
11 Side wall

What is claimed is:

1. A fastening apparatus for fastening a high-voltage storage housing to a bodyshell part of a motor vehicle, comprising:
    a plurality of fastening elements which are able to be connected to the bodyshell part of the motor vehicle; and
    a base element which is formed in one piece with the fastening elements and via which the fastening apparatus is able to be connected to the high-voltage storage housing, wherein
    the base element comprises a framework structure as a bar arrangement having a plurality of webs via which the fastening elements are connected to one another.
2. The fastening apparatus according to claim 1, wherein the fastening apparatus is a cast part or a forged part.
3. The fastening apparatus according to claim 1, wherein at least one of the fastening elements is arranged at a crossing point of at least two webs.
4. The fastening apparatus according to claim 1, wherein the fastening elements have bores via which the fastening apparatus is able to be brought into engagement with the bodyshell part.
5. The fastening apparatus according to claim 1, wherein at least two webs are connected to one another via a surface element which is bordered by the webs and which has at least one bore, a plane of the surface element extending parallel to the framework structure.
6. The fastening apparatus according to claim 1, wherein at least one of the fastening elements is connected to at least three webs which are arranged in a plane at an angle to one another.
7. The fastening apparatus according to claim 1, wherein the fastening elements project beyond the webs at at least one support side of the fastening apparatus, and
    the support side is configured to be placed onto the bodyshell part for connecting the fastening apparatus to the bodyshell part.
8. The fastening apparatus according to claim 1, wherein the fastening apparatus has a bearing side on which the base element bears areally against the bodyshell part when the fastening apparatus is fastened via the fastening elements to the bodyshell part.
9. The fastening apparatus according to claim 8, wherein all the webs of the framework structure bear against the bodyshell part when the fastening apparatus is fastened via the fastening elements to the bodyshell part.
10. The fastening apparatus according to claim 1, wherein the fastening elements are integrated into the framework structure of the base element.
11. A high-voltage storage housing comprising a fastening apparatus according to claim 1.
12. The high-voltage storage housing according to claim 11, wherein
    the fastening apparatus is arranged on an end-side side wall of the high-voltage storage housing.

13. The high-voltage storage housing according to claim 12, wherein
the fastening apparatus is arranged on an end-side side wall of the high-voltage storage housing, which end-side side wall is at the front along a vehicle longitudinal direction in an installation position of the high-voltage storage housing in the motor vehicle, and projects perpendicularly from the front end-side side wall.

\* \* \* \* \*